United States Patent
Yamasaki et al.

(10) Patent No.: US 8,229,949 B2
(45) Date of Patent: Jul. 24, 2012

(54) APPARATUS, METHOD AND PROGRAM PRODUCT FOR PRESENTING NEXT SEARCH KEYWORD

(75) Inventors: Tomohiro Yamasaki, Tokyo (JP); Takahiro Kawamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 12/437,584

(22) Filed: May 8, 2009

(65) Prior Publication Data

US 2010/0017390 A1    Jan. 21, 2010

(30) Foreign Application Priority Data

Jul. 16, 2008   (JP) ................................. 2008-184896

(51) Int. Cl.
*G06F 17/30* (2006.01)
(52) U.S. Cl. .................................................. 707/766
(58) Field of Classification Search .................. 707/722, 707/765–768
See application file for complete search history.

(56) References Cited

U.S. PATENT DOCUMENTS

| | | | |
|---|---|---|---|
| 6,816,850 B2 * | 11/2004 | Culliss | 707/711 |
| 2007/0100799 A1 * | 5/2007 | Rose et al. | 707/3 |
| 2008/0033938 A1 | 2/2008 | Okamoto et al. | |
| 2009/0204609 A1 * | 8/2009 | Labrou et al. | 707/5 |

OTHER PUBLICATIONS

Yahoo!Japan search "What is 'Related Search Word,'" http://help.yahoo.co.jp/help/jp/search/web/web-17.html, Nov. 5, 2008.

* cited by examiner

*Primary Examiner* — Thu-Nguyet Le
(74) *Attorney, Agent, or Firm* — Turocy & Watson, LLP

(57) ABSTRACT

Described is a next search keyword presentation apparatus, method and program for the presentation of the next recommended search keyword for use in conjunction with the search results. There is provided an apparatus of presenting relevant next search keywords, including an input unit for inputting a search keyword. A search control unit sends search keywords to a search system and receives search results which are displayed as documents on a display unit. A text body extraction unit extracts the text body and an analysis unit carries out a semantic attribute analysis of words contained within the text body. The search keywords are stored as user history data which is used with semantic attributes of each word to create document representative information. A cluster representative keyword extraction unit clusters document characteristic information and extracts cluster representative keywords which are displayed as search keyword candidates, providing recommended keywords based on browsing history.

17 Claims, 11 Drawing Sheets

| Date and Time | Action Type | Detailed Example |
|---|---|---|
| 2008/02/14 10:00:00 | Keyword Input | {Reptile} |
| 2008/02/14 10:00:10 | Keyword Input | {Iguana, Lizard} |
| 2008/02/14 10:00:20 | Selection | {Total Hits=795000, No.=3, Title=Living with Iguanas, Details=...} |
| 2008/02/14 10:00:40 | Selection | {Total Hits=795000, No.=5, Title=The Best Habitat for Iguanas, Details=...} |
| 2008/02/14 10:00:45 | Keyword Input | {Iguana, Lizard, Habitat Area} |
| 2008/02/14 10:01:00 | Action | Logout |
| ......... | ......... | ......... |
| 2008/02/14 11:00:00 | Keyword Input | {Actor Name, Movie ABC} |

FIG. 2

| Dictionary Entry | Semantic Attribute | Certainty Factor |
|---|---|---|
| Iguana | Animal, Reptile | 100 |
| Finally | Time、Near Future | 50 |
| Enokidake(a type of mushroom) | Plant、Fungi | 100 |
| Humongous Item | Exaggeration | 80 |
| Singer | Position、Occupation | 100 |
| ......... | ......... | ......... |

FIG. 3

| Rule Entry | Semantic Attribute | Certainty Factor |
|---|---|---|
| Mister ABC, Miss DEF, Mdm. XYZ | Person | 80 |
| ABC Prefecture, City DEF | Place Name, Japanese City | 100 |
| Disease ABC | Health, Disease Name | 100 |
| Schedule ABC | Time、Near Future | 80 |
| ......... | ......... | ......... |

FIG. 4

| Semantic Attribute | Certainty Factor |
|---|---|
| Animal, Mammal | 50 |
| Animal, Bird | 30 |
| Animal, Reptile | 100 |
| Place Name, Japanese City | 80 |
| Place Name, Foreign City | 30 |
| Position, Singer | 10 |
| Person Name, Entertainer | 100 |
| Person Name, Sportsman | 20 |
| ......... | ......... |

FIG. 5

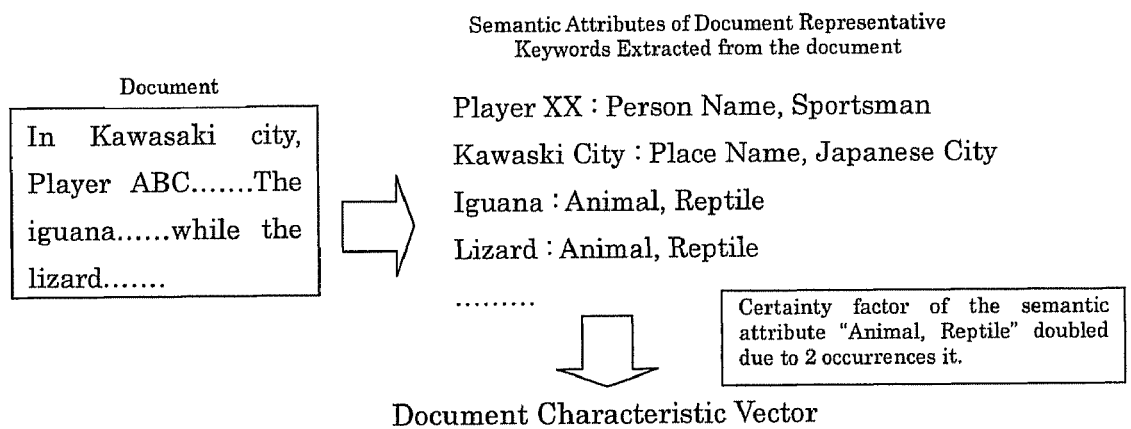

Semantic Attributes of Document Representative Keywords Extracted from the document Document In Kawasaki city, Player ABC.......The iguana......while the lizard.......

Player XX : Person Name, Sportsman
Kawaski City : Place Name, Japanese City
Iguana : Animal, Reptile
Lizard : Animal, Reptile
.........

Certainty factor of the semantic attribute "Animal, Reptile" doubled due to 2 occurrences it.

Document Characteristic Vector

| Semantic Attribute | Certainty Factor |
|---|---|
| Animal, Mammal | 50 |
| Animal, Bird | 30 |
| Animal, Reptile | 100 |
| Place Name, Japanese City | 80 |
| Place Name, Foreign City | 30 |
| Position, Singer | 10 |
| Person Name, Entertainer | 100 |
| Person Name, Sportsman | 20 |
| ......... | ......... |

FIG. 6

| Morpheme w | l(w) | n(w) | t(w) | c(w) |
|---|---|---|---|---|
| ......... | ......... | ......... | ......... | ......... |
| (Inhabit) | 2 | 17 | 11 | 5 |
| (Habitat) | 4 | 10 | 0 | 0 |
| (Habitat area) | 4 | 4 | 3 | 2 |
| (Area Information) | 4 | 8 | 2 | 2 |
| (Animal Habitat Area) | 6 | 4 | 1 | 1 |
| ......... | ......... | ......... | ......... | ......... |

| Document | Semantic Attribute | Document Representative Keyword Alternative |
|---|---|---|
| Document 1 | Animal, Reptile | Iguana |
|  | Place Name, Japanese City | Tokyo |
| Document 2 | Animal, Reptile | Iguana |
| Document 3 | Animal, Reptile | Iguana |
|  | Animal, Reptile | Lizard |
|  | Place Name, Japanese City | Kawasaki |

FIG. 13

APPARATUS, METHOD AND PROGRAM PRODUCT FOR PRESENTING NEXT SEARCH KEYWORD

CROSS-REFERENCE TO RELATED APPLICATIONS

This application is based upon and claims the benefit of priority from the prior Japanese Patent Application No. 2008-184896 filed on Jul. 16, 2008; the entire contents of which are incorporated herein by reference.

TECHNICAL FIELD

The present invention relates to a next search keyword presentation apparatus, method and program for the presentation of the next recommended search keyword for use in conjunction with the search results.

BACKGROUND

Personal computers have become increasingly important and the number of users has skyrocketed. With the advent of the Internet, users are now going online to sieve through the treasure trove of information available to them at the click of the mouse. However, in order for computer users to obtain useful information, users have to utilize search engines effectively. It is the usual practice for a user to input search keywords relevant to the topic of interest in order to commence the search process. The search engine then searches through the myriad of information databases to obtain related documents before displaying the related documents as the search results. Although search engines have grown more complex through the years, providing results most relevant to the users' inputs is difficult, and there are still many instances where the search results hold very little or no interest whatsoever for the user. In such instances, there is a need for the user to replace some of the keywords with other, more relevant terms. However, this is a tedious process that might have to be carried out repeatedly before the user can attain the desired result.

To remedy the situation of repeated searches, certain search engines offer some search options to narrow the scope of documents found. For example, one common method is to have the search results displayed along with a choice to add some seemingly relevant keywords to the basic keyword itself, creating a new search keyword as currently used by Yahoo!® Search.

Although such an option is available, there are still some problems with the new search keywords. And although such an option to choose new search keywords to narrow the list of results is available, there are still a large number of search keywords to which no additional keywords are offered. Also, the seemingly relevant keywords are selected by the system and are based on a fixed, predetermined method.

SUMMARY

To solve the above described problems, the present invention provides an apparatus, method and program to supply user-relevant next search keywords for appending to the original search keywords.

According to an embodiment of the present invention, there is provided an apparatus of presenting relevant next search keywords, the apparatus including an input unit for inputting a search keyword. A search control unit sends the search keyword to a search system and receives search results from the search system which are displayed as documents on a display unit. A text body extraction unit then extracts the text body from the documents and an analysis unit carries out a semantic attribute analysis of words contained within the text body. The search keyword is stored as user history data which is used with the semantic attributes of each word to create document representative information. A cluster representative keyword extraction unit clusters document characteristic information and extracts cluster representative keywords which are displayed as the search keyword candidate, thereby providing the user with a recommended keyword based on past browsing history.

According to another embodiment of the present invention, there is provided an apparatus of presenting relevant next search keywords, the apparatus including an input unit for inputting a search keyword. A search control unit sends the search keyword to a search system and receives search results from the search system which is displayed as documents on a display unit. An analysis unit carries out an analysis of the semantic attributes of the words contained within the documents. A storage unit stores the search keywords as user history data so as to keep track of user preference. A creation unit then creates document representative information by using the semantic attributes of each word and the user history data. A cluster representative keyword extraction unit clusters document characteristic information and extracts cluster representative keywords to be displayed as the next search keyword candidate. The actions performed by the user on the next search keywords which are displayed is then further stored as part of the user history data to provide an even stronger link between the next search keyword displayed and the preferences of the user.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

FIG. 2 is a diagram illustrating the history storage unit 12.

FIG. 3 is a diagram illustrating the semantic attribute dictionary table.

FIG. 4 is a diagram illustrating the semantic attribute rule table.

FIG. 5 is a diagram illustrating the user preference vector.

FIG. 6 is a diagram illustrating the document characteristic vector.

FIG. 13 is a diagram illustrating the document representative keyword alternative table example.

DETAILED DESCRIPTION

An embodiment of the present invention is described below with reference to the attached drawings.

Figure 1:
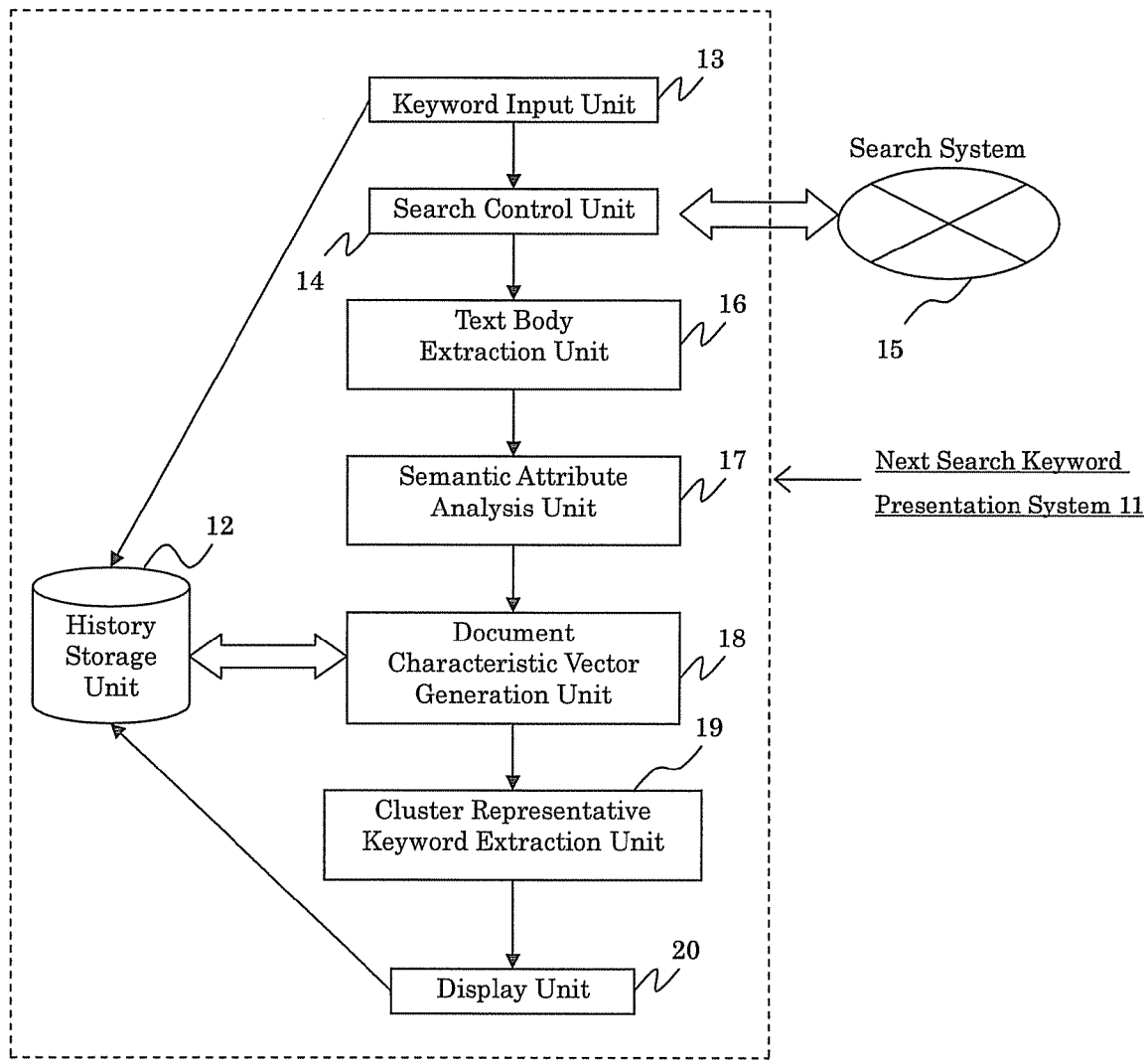
FIG. 1 is a functional block diagram illustrating the next search keyword presentation system of the present invention

FIG. 1 shows an actual configuration of the next search keyword presentation system 11 according to an embodiment of the present invention. As shown in the diagram, next search keyword presentation system 11 includes a history storage unit 12 for the storage of user preferences and search history, a keyword input unit 13 for the entry of keywords by the user which serves as the search requirement, and a search control unit 14 which sends the search keyword entered by the user to search system 15. The search control unit 14 receives, as search results, the documents containing the inputted search keyword.

The presentation system 11 also includes a text body extraction unit 6 which extracts the relevant information from the search results, a semantic attribute analysis unit 17 for analyzing and extracting semantic attributes from words in the extracted texts, and a document characteristic vector creation unit 18 to create document characteristic vectors based on data from the semantic attribute analysis results and the history storage unit 12. A cluster representative keyword extraction unit 19 clusters the document characteristic vectors and extracts cluster representative keywords for the clusters containing the documents represented by the vectors as well as document representative keywords for each document in the cluster. A search result display unit 20 for presenting the next search keywords for each documents found based on the keywords extracted for each document. In this embodiment, the search control unit 14 is connected to an external search system 15.

The history storage unit 12 tracks the user's activities on the keyword input unit 13 and the search result display unit 20. This effectively means that the system tracks the users' keyword entries, search result selections, and any other actions performed after any selection of the search results and stores this information as a user history. The information stored in the history storage unit 12 can be used in subsequent searches to facilitate searching operations.

FIG. 2 offers an example of how keyword groups are entered and used in the search process as well as how the actions performed after selections are tracked. In this example, the keyword "Reptile" is entered as the search keyword but it yields no satisfactory result. As such, two new searches are initiated with the keywords "Iguana" and "Lizard" which yield a total of 795,000 hits. The third and fifth entries with the titles "Living with Iguanas" and "The Best Habitat for Iguanas" are then selected. A further search is later initiated with the addition of the new keyword "Habitat Area" for use in conjunction with the earlier keywords. The user then logs out. After some time, a new unrelated search is initiated with the keywords "Actor Name" and "Movie ABC".

For simplicity's sake, this particular embodiment only keeps track of the users' actions. It is also not inconceivable for the system to keep track of the users' everyday activities. For example, when a user utilizes the system when he is watching the television, there is a possibility that the user may want to conduct a search on the broadcast contents. Thus, it makes sense for the system to maintain a record of the broadcast content history. Such information includes textual data like electronic program guide information sent along with the broadcast images, data transmissions, subtitles or ticker information, visual information relating to the persons or buildings in the transmission, audio data such as music or speeches made in the transmission and its related textual information like speech contents and names of songs.

In the event that the user utilizes the system in an outdoor environment, e.g., in the course of a bus or train ride, to search for information relating to the route or region, information taken from the GPS or the route can be stored in the history storage unit 12 for future reference.

As mentioned earlier, the search control unit 14 is connected to an external search system 15 in this embodiment. Keywords entered into the system via the keyword input unit 13 are then sent to the external search system 15 by the search control unit 14. It is also possible for the search system 15 to be incorporated into next search keyword presentation system 11 and not be connected externally.

The text body extraction unit 16 then removes any portion deemed unrelated to the text body of the article such as the header, footer, advertisement, and links. The text body extraction unit 16 then extracts the largest proportion of the document deemed to contain relevant information. In the event that the document is exceedingly long or if it is not possible to determine the number of topics covered in the document, the text body extraction unit 16 then subdivides the document according to the paragraphs or other spatially logic format before extracting each individually subdivided paragraph and treating each subdivided paragraph as a separate block of text body.

The semantic attribute analysis unit 17 attaches related attributes to words categorized as keywords. These words include commonly used terms like "amount" and "time", common nouns like people names, names of places, animals or plants. FIG. 3 shows the matching of the keywords with a semantic attribute dictionary table stored in the semantic attribute analysis unit 17 for the semantic analysis process.

FIG. 4 illustrates the character string arrangement, also known as morpheme arrangement, rule matching method using a semantic attribute rule table stored in the semantic attribute analysis unit 17. While it is acceptable to use multiple attributes on a single word like "Kawasaki" which has attributes relating to people, devices, and place names, it is desirable to match the word with the most closely related attribute for the user's convenience. This can be achieved by using the keyword with the highest certainty factor as accorded by the dictionary or the matching rules; or by choosing a keyword which has the smallest deviation in meaning from the keywords preceding and/or following it.

The document characteristic vector creation unit 18 extracts a document representative keyword chosen from words which have been accorded semantic attributes according to semantic attribute dictionary table in FIG. 3 or the semantic attribute rule table in FIG. 4. It then creates a user preference vector by processing the document representative keyword together with information stored within history storage unit 12.

FIG. 5 illustrates an example of the user preference vector. The semantic attribute analysis unit 17 analyses the user history and attaches certainty factors to the semantic attributes. The document characteristic vector creation unit 18 then creates the user preference vector. As shown in this example, the user has shown an interest in topics related to (Animal, Reptiles) and (People Names, Artists), thus resulting in the higher certainty factor of 100 for these two semantic attributes. Although he has searched for (Position, Singers) in the past, he has not shown a preference for it, thereby resulting in a certainty factor of only 10 for this semantic attribute. After the user preference vector is created, the document characteristic vector created by using the documents and the user preference vector. FIG. 6 shows how the document representative vector is created. As shown in the figure, the document characteristic keywords for each document is first extracted and certainty factors based on the user preference vector are attached to the semantic attributes of the keywords, thereby creating a list. The list is then compared to the user preference vector to create the document characteristic vector.

In this example, the words "frog" and "iguana" are in the sample document and thus the semantic attribute (Animal, Reptile) appears in the list twice. As the words Player OO and Kawasaki city appear only once, the semantic attributes (People Name, Athlete) and (Place Name, Japanese City) also appear once each in the list. This is then compared with the user preference vector shown in FIG. 5, creating the document characteristic vector wherein the certainty factors of the semantic attribute are multiplied with the number of times the semantic attributes are found in the document. In this case, the semantic attribute (Animal, Reptile) appears twice, thus this document has a certainty factor of 200 for this particular semantic attribute. It must be noted that as the preferences differ from user to user, the created document characteristic vector is unique to the user and document set.

The keyword extraction unit 19 carries out clustering on the document characteristic vectors before it extracts the cluster representative keywords as well as the document representative keywords for the documents contained within the cluster. The document representative keywords for all the documents contained in the cluster can be extracted and the distances between document representative keywords can be calculated. The document representative keywords with the largest distance between them is chosen and extracted.

Similarly for the cluster representative keywords, all cluster representative keywords can be extracted before the distances between cluster representative keywords are calculated. The cluster representative keywords with the largest distance between them can then be chosen and extracted.

The display unit 20 then takes the keywords selected to represent the documents and/or clusters and display them along with the search result titles and abstracts. At this point, the users' actions (e.g. choice of search results, actions following the selection of search results etc.) performed on the display unit 20 can be tracked and stored as history information.

The clustering process and the document characteristic vector creation process carried out by the next search keyword presentation system 11 is described below by referring to the flowchart in FIG. 7. All documents listed in the search results will first have the text body extracted from them by the text body extraction unit 16 (S710). The extracted text body then undergoes the semantic attribute analysis, carried out by the semantic attribute analysis unit 17, and groupings of (keyword, semantic attribute) can be stored temporarily (S720). The extracted keywords can then have certainty factors attached to them according to the rules listed in the semantic attribute dictionary or a rule table and groupings of (semantic attribute, certainty factor) can be stored temporarily. The document representative keyword is then extracted by the documents characteristic vector creation unit 18 (S730). The document characteristic vector creation unit 18 then compares the extracted keywords with the search keywords stored as history in the history storage unit 12 to find the number of occurrences for each semantic attribute (S740). The documents then are accorded certainty factors according to the number of occurrences of the semantic attributes, giving rise to the creation of document characteristic vectors by the document characteristic vector creation unit 18 (S750).

Next, the clustering process can be carried out by the cluster representative keyword extraction unit 19. First, all created document characteristic vectors can then be clustered into individual clusters, with each cluster containing only one element (S760). Document characteristic vectors A and B proceed to have their distance calculated via the cluster representative keyword extraction unit 19 (S770). The calculated distance is then compared to a pre-determined threshold value (S780). If the calculated distance is found to be smaller than a pre-determined value (S780 Y), then document characteristic vectors A and B are merged to form a new document characteristic vector C where C=A+B. The clusters containing document characteristic vectors A and B are deleted after the merger and a new cluster consisting the newly created document characteristic vector C is created (S790). However, if the calculated distance is found to be greater than the pre-determined value (S780 N), then it is taken that there are no clusters to be merged and the clustering process is terminated.

Figure 7:
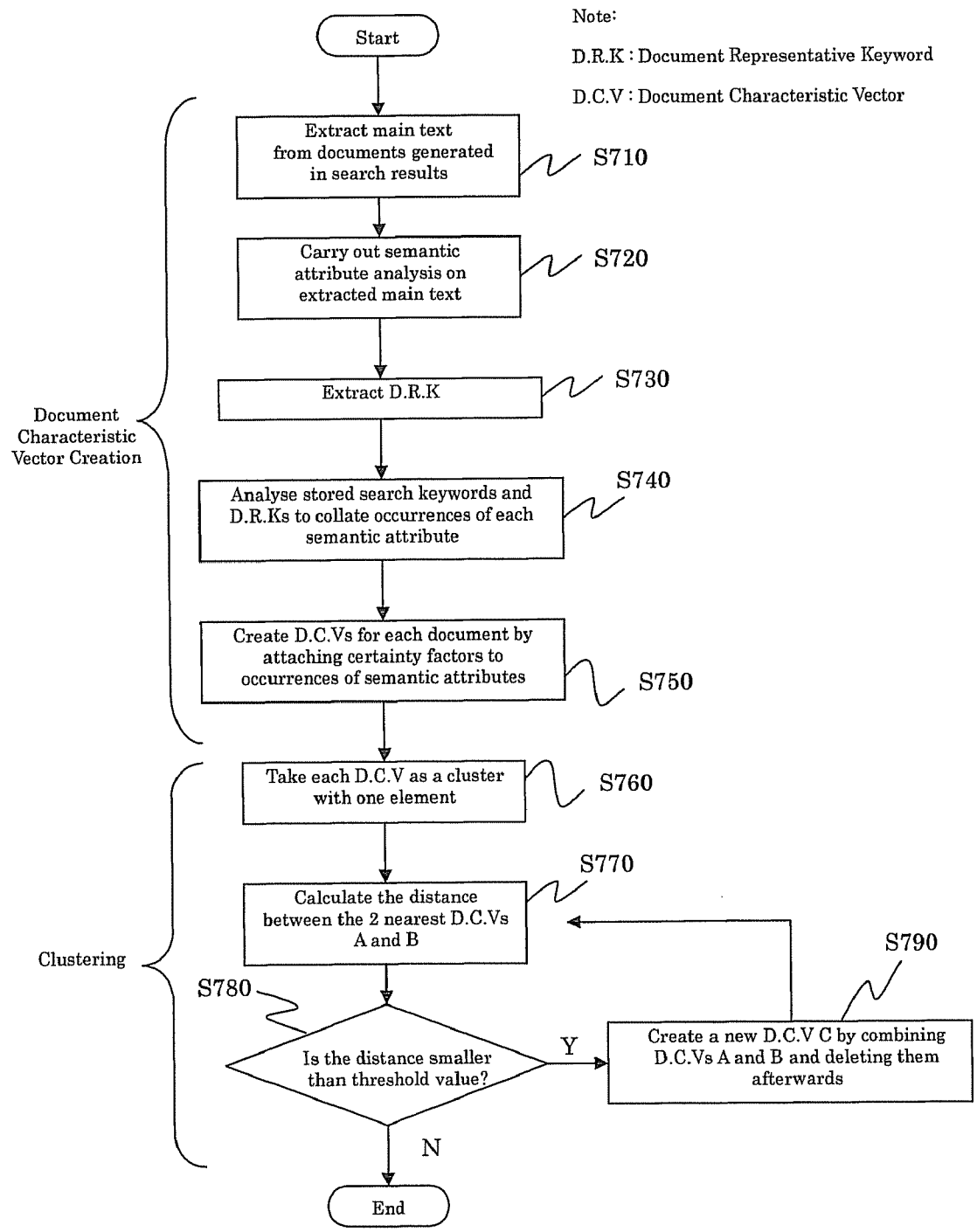
FIG. 7 is a diagram illustrating the flow of the document characteristic vector creation and clustering processes.
Figure 8:
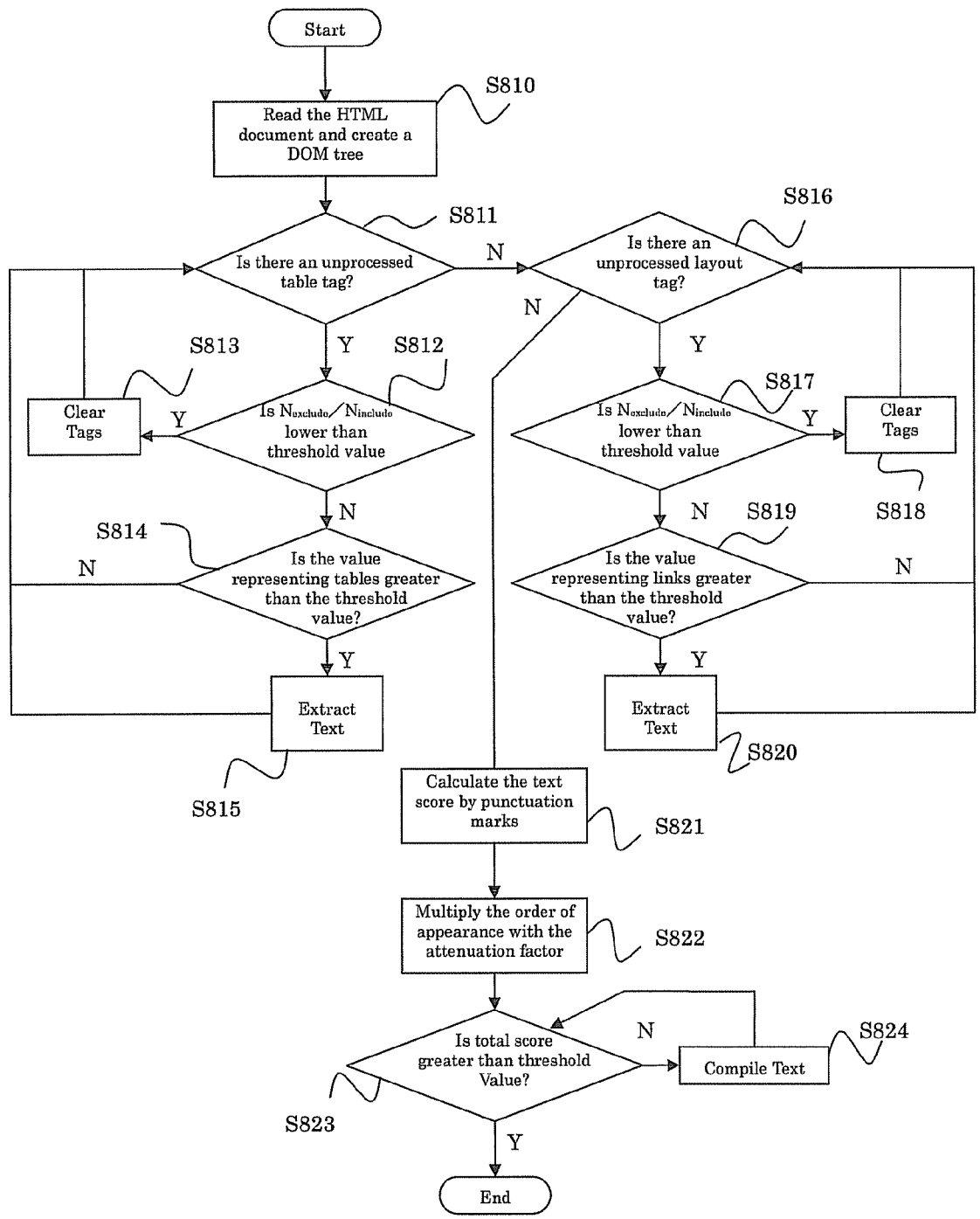
FIG. 8 is a diagram illustrating the flow of the text body extraction process S710 of FIG. 7.

Next, step S710 of FIG. 7 is explained in detail. The flowchart detailing the process by which the text body is extracted from a HTML document chosen as part of the search results is shown in FIG. 8.

With regards to tags contained within the HTML document, $N_{exclude}$ represents the character count not including tags (i.e. tags contained within tags are not included) and $N_{include}$ represents the character count including tags (i.e. tags contained within tags are included). The HTML document is first read and analysed in order to create the document object model (DOM) tree (S810). A check is then carried out on the created DOM tree for the existence of table tags, e.g. <TABLE>, that have not been processed (S811). If any unprocessed table tags are found, then $N_{exclude}/N_{include}$ is calculated and compared to a threshold value (S812). If the $N_{exclude}/N_{include}$ value is found to be lower than the threshold value (S812 Y), then the corresponding tag is deleted and another check for unprocessed table tags is carried out (S813). If the $N_{exclude}/N_{include}$ value is found to be higher than the threshold value (S812 N), then the corresponding tag is not considered as a table tag and the table representation value is compared to the threshold value instead (S814). If the table representation value were to be higher than the threshold value (S814 Y), then the corresponding tag is considered as a table containing relevant text bodies and the corresponding text block is extracted before the process is looped back to check for unprocessed table tags once again (S815). If the table representation value is found to be lower than the threshold value, then the process loops back and another check for unprocessed table tags is carried out (S814 N).

If no unprocessed table tags are found, then a check is carried out to determine if there are any layout tags, e.g. <DIV>, <CENTER> that have not been processed (S816). If any unprocessed layout tags are found (S816 Y), then $N_{exclude}/N_{include}$ is calculated and compared to a threshold value (S817). If the $N_{exclude}/N_{include}$ value is found to be lower than the threshold value (S817 Y), then the corresponding tag is deleted and another check for unprocessed layout tags would be carried out (S818). If the $N_{exclude}/N_{include}$ value is found to be higher than the threshold value (S817 N), then the corresponding tag is considered a layout tag and the links representation value are calculated.

The link value can then be compared to a threshold value (S819). If the links representation value is higher than the threshold value (S819 Y), then the corresponding tag can be recognized as a tag containing relevant text bodies and the corresponding text block can then be extracted before the process is looped back to check for unprocessed layout tags once again (S820). If the links representation value is found to be lower than the threshold value (S819 N), then the process loops back and another check for unprocessed layout tags can be carried out. If no unprocessed layout tags are found (S816 N), then a score for the text box can be calculated (S821). This score can be based on the number of punctuation marks and it can be considered as the base score. The scores can then be arranged in order of appearance and an attenuation factor can be applied to the scores to calculate combined scores (S822).

The combined score can then be compared to a threshold value (S823). If the combined score is found to be lower than the threshold value (S823 N), then the text can be compiled and the text body can be extracted (S824). If the score is found to be greater than the threshold value (S823 Y), then the process of extracting the text body from a HTML document can be ended.

Following is an explanation on the keyword extraction process as per this embodiment. In the present invention, the widely adopted C-value method to extract keywords (especially compound words) from the document is used. The documents contained within the cluster C are first set as Ds(C) while the morphemes contained within Ds(C) are set as ws(C). The statistical data of the morphemes w contained within ws(C) are then collated. The C-value of a morpheme w is then determined by computing C-value $(w)=(l(w)-1)*(n(w)-t(w)/c(w))$. If morpheme w has a C-value greater than a predetermined value, then the representative keyword of cluster C can be extracted and the cluster representative keyword extraction process can be terminated. However, the calculation of the C-value may take a long time if there are a large number of documents. Owing to the constraints of speed and time, it can be necessary to sacrifice accuracy for speed and extract items with the highest frequency or longest string length instead.

Figures 9, 10:
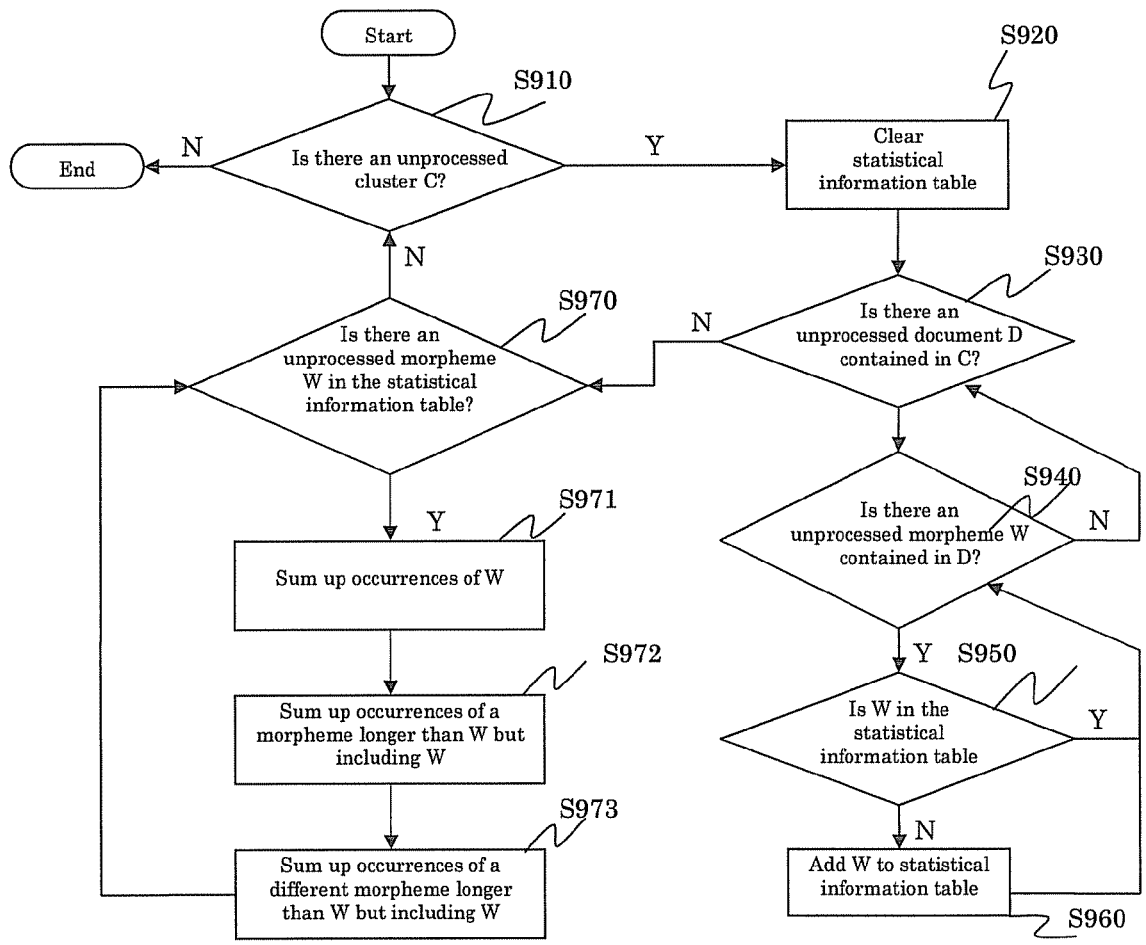
FIG. 9 is a diagram illustrating how the collation of statistical data for the extraction of morphemes is carried out.
FIG. 10 is a diagram illustrating the collated statistical data used for the extraction of morphemes in a tabulated format

FIG. 9 shows a flowchart detailing the process by which statistical data is collated. First, a check is carried out to determine if there are any unprocessed clusters C (S910). If an unprocessed cluster C exists (S910 Y), the statistical information table containing the consolidated information can be cleared (S920). A check can then be carried out to determine if there are any documents D within the cluster C that have not been processed (S930). If an unprocessed document D exists within the cluster C (S930 Y), then a check can then be carried to check if there are any unprocessed morphemes W within document D (S940). If there is an unprocessed morpheme W within the document D (S940 Y), then the unprocessed morpheme W can then be checked if it is contained in the statistical information table (S950). If the morpheme W is not contained in the statistical information table (S950 N), then the morpheme W can be added in and the process loops back to check for unprocessed morphemes W (S960). If the morpheme W is found to be in the statistical information table (S950 Y), then the process loops back to check for unprocessed morphemes W. If no unprocessed morphemes W are found inside document D (S940 N), then the process loops back to the check for unprocessed documents D within cluster C.

If no unprocessed documents D are found in cluster C (S930 N), then a check can be carried out on the statistical information table to determine if there are any unprocessed morphemes W in it (S970). If an unprocessed morpheme W is found (S970 Y), then the number of occurrences of the morpheme W can be summed up (S971). Next, the number of occurrences of a morpheme longer than the morpheme W but inclusive of it can be summed up (S972). The number of occurrences of another longer morpheme different from the previous morpheme, but inclusive of morpheme W can also be summed up before looping back to the check for unprocessed morphemes W in the statistical information table (S973). If no unprocessed morphemes W are found in the statistical information table (S970 N), then the process loops back to checking for unprocessed clusters C (S910). If no unprocessed clusters C are found (S910 N), then the entire process for the extraction of representative keywords for clusters can be ended.

FIG. 10 shows an example of the statistical data in a tabulated format. l(w) represents the string length of morpheme w. n(w) represents the number of occurrences of morpheme w in cluster C. t(w) represents the number of occurrences of a longer morpheme formed with morpheme w as a part thereof in cluster C, including the number of occurrences of morpheme w. c(w) represents the number of occurrences of a different longer morpheme formed with morpheme w as a part thereof in cluster C, including the number of occurrences of morpheme w.

Figure 11:
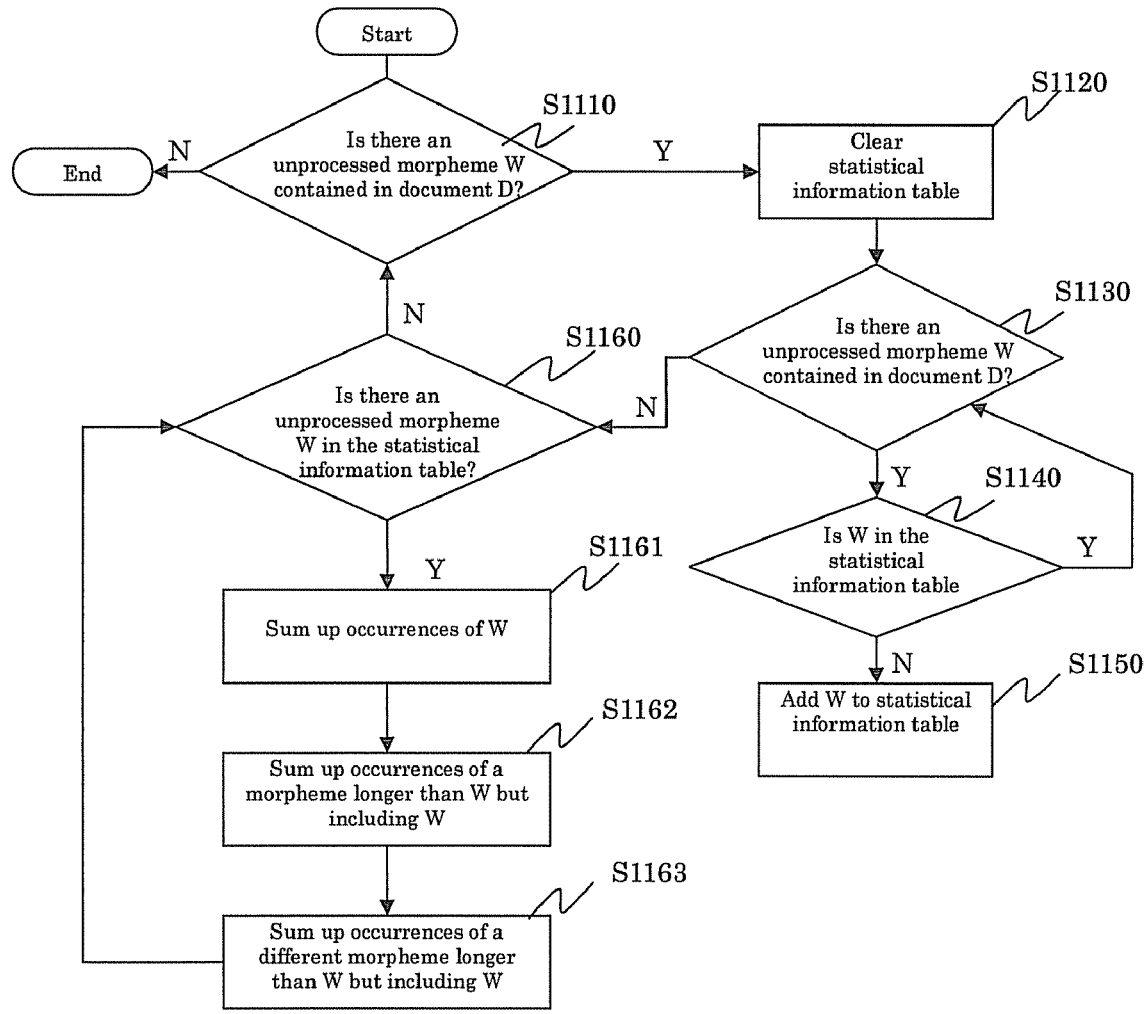
FIG. 11 is a diagram illustrating how the document characteristic phrase extraction process is carried out.

FIG. 11 shows a flowchart detailing the process by which a keyword is extracted as the document characteristic keyword. First, a check is carried out to determine if there are any unprocessed documents D (S1110). If an unprocessed document D exists (S1110 Y), then the statistical data table containing the consolidated information can be cleared (S1120). A check can then be carried out to determine if there are any morphemes W within document D that have not been processed (S1130). If an unprocessed morpheme W exists within document D (S1130 Y), then a check can then be carried to check if it is contained in the statistical data table (S1140). If morpheme W is not contained in the statistical table (S1140 N), then it can be added in and the process loops back to check for unprocessed morphemes W in document D (S1150). If the morpheme W is found to be in statistical table (S1140 Y), then the process loops back to check for unprocessed morphemes W. If no unprocessed morphemes W are found (S1130 N), then a check can be carried out on the statistical table to determine if there are any unprocessed morphemes W therein (S1160). If an unprocessed morpheme W is found (S1160 Y), then the number of occurrences of the morpheme W can be summed up (S1161). Next, the number of occurrences of a morpheme longer than the morpheme W but inclusive thereof can be summed up (S1162). The occurrences of another longer morpheme different from the previous morpheme, but inclusive of morpheme W can also be summed up before looping back to the check for unprocessed morphemes W in the statistical table (S1163). If no unprocessed morphemes W are found in the statistical table (S1160 N), then the process loops back to checking for unprocessed documents D. If no unprocessed documents D are found (S1110 N), then the entire process for the extraction of document characteristic keywords can be terminated.

Next, the cluster representative keyword extraction unit 19 extracts the characteristic keywords representing the documents as per the document characteristic keyword extraction process described in FIG. 11. However, there is a high chance that the extracted keywords can be repeated for documents contained within the same cluster. As such, the extracted keywords have their distances calculated and only the keyword combinations with the largest distances between them are selected. By carrying out the processes described hereon, easily differentiable keywords for each document are chosen.

Figure 12:
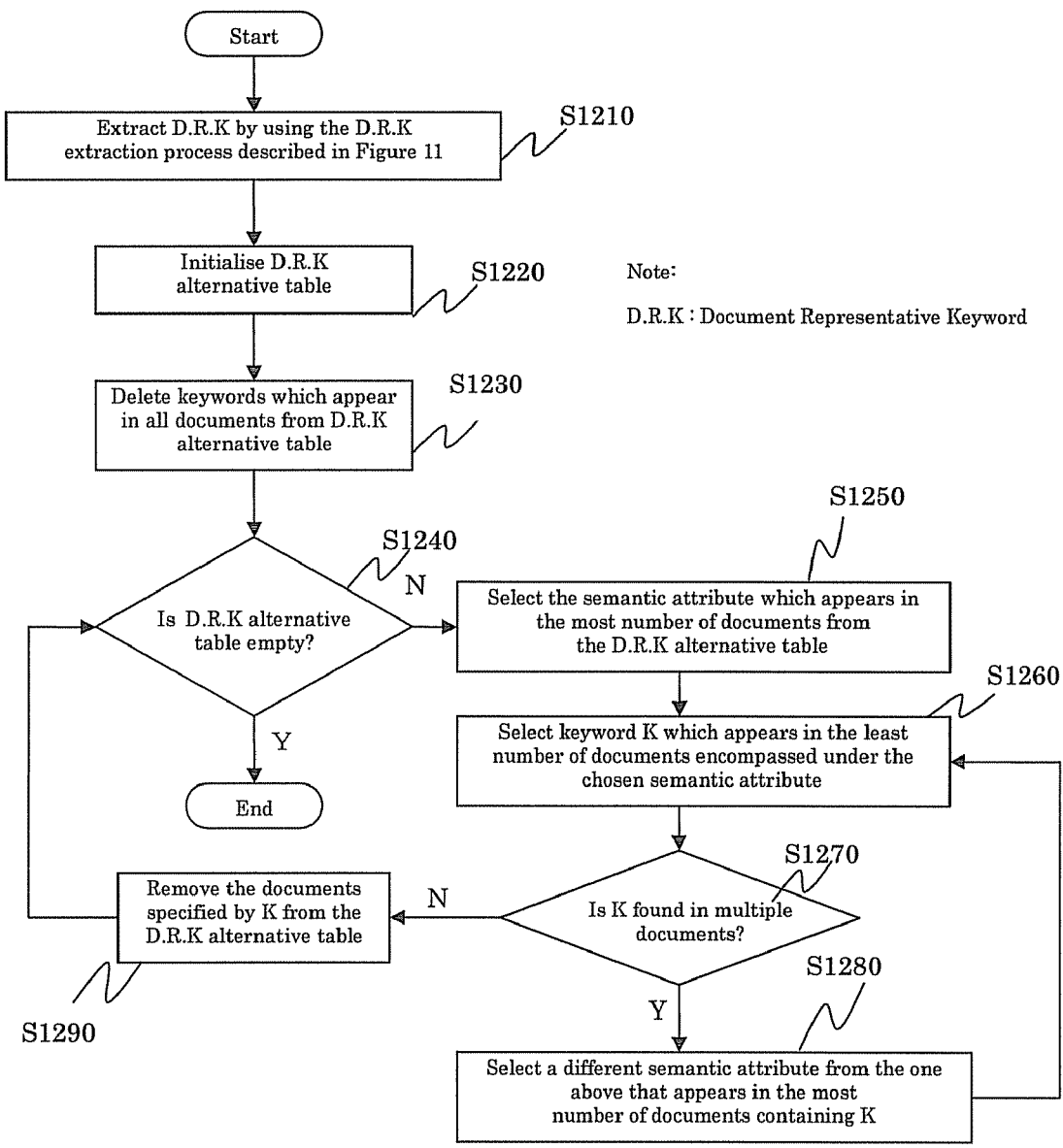
FIG. 12 is a diagram illustrating how the unique document phrases representing individual documents are extracted from within a cluster.

The flowchart in FIG. 12 shows the process by which document representative keywords are extracted. First, the document characteristic keywords are extracted via the document characteristic keyword extraction process shown in FIG. 11 (S1210). Next, the document representative keyword alternative table which contains the entries (document, semantic attribute, keyword), are reset to its default settings and stored temporarily (S1220). All the keyword entries appearing in all documents from the document representative keyword alternative table (S1230) are deleted. A check can then be done on the table to determine if it is empty (S1240). If it is not empty (S1240 N), then the semantic attribute which appears the most number of times across all the documents is chosen (S1250). The keyword K which appears the least number of times across the documents is then chosen from this semantic attribute and taken to be the document representative keyword (S1260). A check is then performed on keyword K to determine if it appears in multiple documents (S1270). If it appears in multiple documents (S1270 Y), then a semantic attribute, differing from the previous semantic attribute, which appears the most number of times across all the documents containing keyword K is then chosen before the process loops back to choosing the keyword K which appears the least number of times across the documents (S1280). If the keyword K does not appear in multiple documents (S1270 N), then the document represented by K is then deleted from the document representative keyword alternative table (S1290). The process then loops back to check if the table is empty. If the table is found to be empty (S1240 Y), then the process by which easily differentiable document representative keywords are extracted for each document within the cluster is terminated.

There are many suitable methods to carry out the calculations for the distances between keywords, e.g., calculations based on parts of speech, calculations based on semantic attributes etc. In the following example, using semantic attributes to carry out the keyword selection process are examined.

FIG. 13 shows an example of the document representative keyword alternative table. The table is formed based on the combination of (document, semantic attribute, keyword) which is in turn formed from representative keywords extracted from documents and keyword semantic attributes and it is cleared to its default settings at the start. In this example, the keywords "Iguana", which carries an "Animal, Reptile" semantic attribute, and "Tokyo", which carries a "Place Name, Japanese City" semantic attribute are extracted from document 1. From document 2, the keyword "Iguana", which carries an "Animal, Reptile" semantic attribute, are extracted. From document 3, the keywords "Iguana", which carries an "Animal, Reptile" semantic attribute, "Lizard", which carries a "Animal, Reptile" semantic attribute, and "Kawasaki", which carries a "Place Name, Japanese City" semantic attribute, are extracted.

In order to obtain cluster representative keyword alternatives with the largest distances therebetween, the cluster representative keyword extraction unit 19 deletes all keywords which are repeated across documents from the document representative keyword alternative table. In the case of FIG. 13, the cluster representative keyword alternative "Iguana" is deleted from the document representative keyword alternative table. If there are no repeating keywords, then nothing is deleted. It must be noted that if the table were to become empty at this juncture, then it means that there are no suitable keywords which can be extracted to differentiate the documents. As such, if the table becomes empty, it can be acceptable to select similar cluster representative keywords for different documents. In other words, since the remaining documents cannot be easily differentiated, it can be acceptable to display all of the documents in a single summary on display unit 20.

The semantic attribute C found in the largest number of documents contained within the document representative keyword alternative table can be selected if the table is to be occupied. If multiple suitable semantic attributes are available, the choice can be made randomly. The choice can also be made by basing the decision on the number of keywords belonging to each semantic attribute, which entails having to accord some kind of ranking to the semantic attributes. An example of such a ranking can be to put the semantic attribute "People names" above "Schedules" as there can be a lot more information regarding "People names". The selection can also be performed by making use of the user history information. For example, if the user has shown an inclination to select "People names", it can be given priority over "Place names". This can also mean that the most recently selected semantic attribute stored as history is given priority However, regardless of the method by which a semantic attribute is chosen, the keyword K chosen by the cluster representative keyword extraction unit 19 is one which appears the least number of times in the documents covered under the semantic attribute. The selection process can be carried out at random or by making use of the users' history information. If a keyword K appears only in one document D, the document D can from that point on be identified under keyword K. Once this is done, the keyword K is extracted and the both the document D and keyword K can be deleted from the document representative keyword alternative table. As long as table is not empty, the process of extracting morphemes representing documents can be carried out repeatedly in order to enable the extraction of keywords specifying the remaining documents. However, if keyword K is repeated in the document group Ds, then the documents in the group can be considered as not having been specified under any keyword. As such, a semantic attribute, different from the earlier selected semantic attribute, which has appeared the most times in the documents contained within the document group Ds is chosen. The keyword extraction process can then be carried out repeatedly until all documents contained within the document group Ds have been specified under keywords.

Figure 14A:
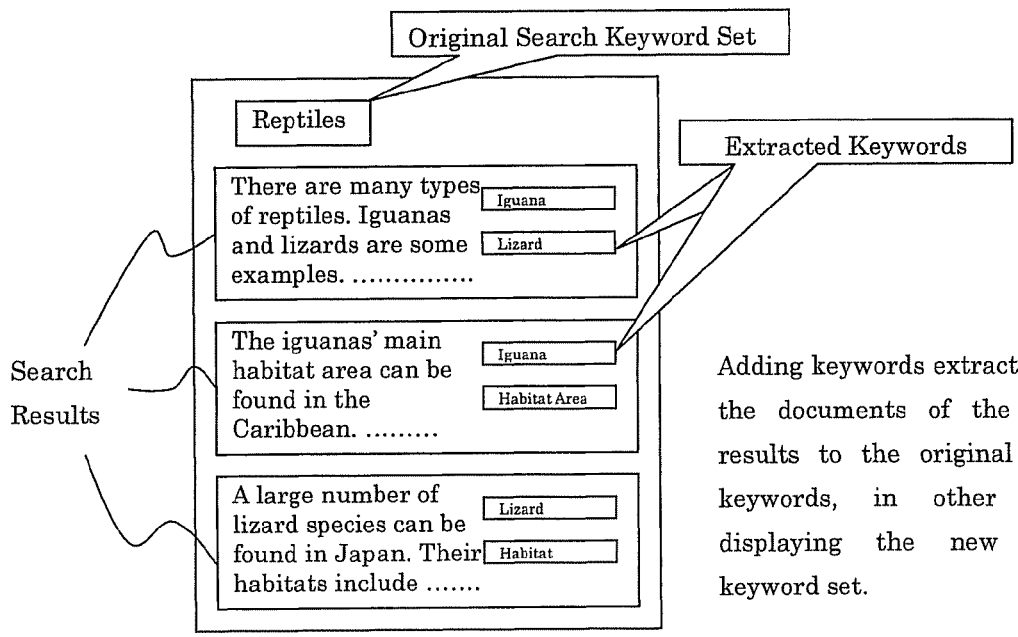
FIG. 14A and 14B are diagrams illustrating a method of presenting the next search keyword in response to the displayed search results.

Next, the process by which the next search keyword is displayed on display unit 20 of FIG. 1 is explained. FIG. 14A shows several suitable ways in which the next search keyword can be displayed. One of the methods can be to display the next search keyword alongside the search result titles and abstracts.

Figure 14B:
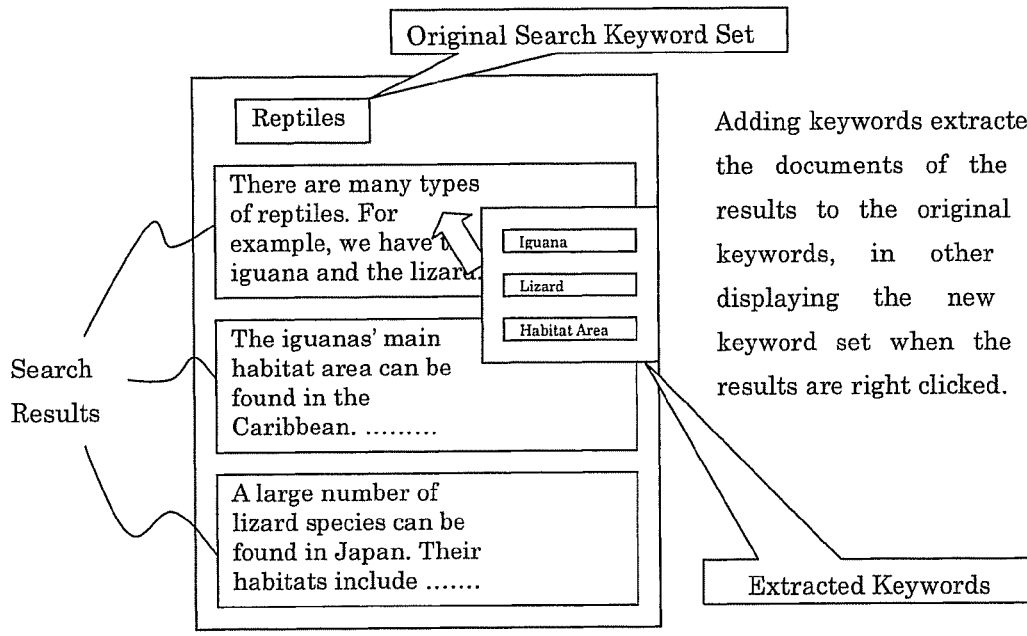

As showing the next search keyword alongside the search results occupy a lot of the space on the screen if the number of displayable keywords increases, then it can be desirable to have the next search keyword pop-up in a small cloud when the mouse hovers above the search result or if the user right-clicks the search result as shown in FIG. 14B. The user is able to set a preference for the display beforehand through the usage of option settings of the system or dynamically by interchanging between the various display options on-the-fly. The display method can also be changed according to the number of next search keywords or the importance of the semantic attributes.

In the previous embodiments, the next search keyword presentation system 11 is used in conjunction with a personal computer. However, it is also possible to utilize the function without the usage of a personal computer. It is now common for people to utilize their portable communication devices, e.g., mobile phones or personal digital assistants (PDAs), to search for information on routes they are currently traveling or to surf the internet. Examples of such information are train arrival and departure schedules, places of interest along the route, etc.

Figure 15:
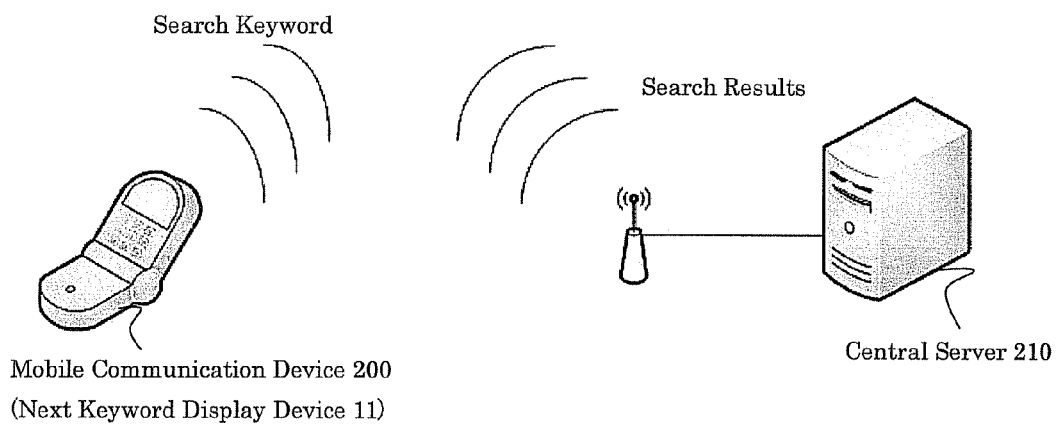
FIG. 15 is a diagram illustrating a method of presenting the next search keyword in response to the displayed search results on a mobile phone in a second embodiment of the present invention.

FIG. 15 shows a second embodiment of the present invention being utilized via a portable communication device. In this embodiment, the next search keyword presentation system 11 is stored on the portable communication device as part thereof, keeping track of the user's preference and actions such as user history within the device. In the event of a new search being carried out, the information stored as user history data can be utilized. The search request generated by the user can then be sent to a central server.

Figure 16:
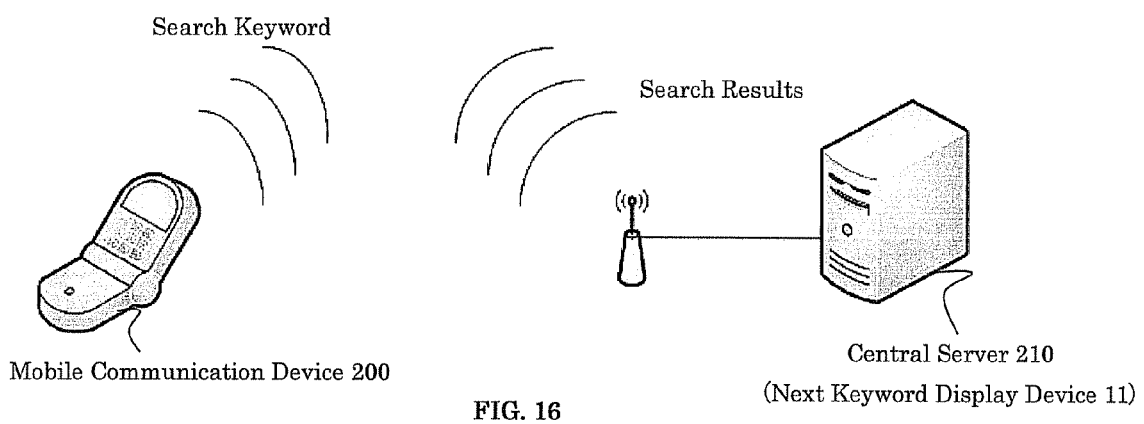
FIG. 16 is a diagram illustrating a method of presenting the next search keyword in response to the displayed search results on a mobile phone in a third embodiment of the present invention.

FIG. 16 shows a third embodiment in which the search request information, in other words, the search keyword, is sent to a central server. In the third embodiment, the next search keyword presentation system 11 is stored on a central server instead. The user can make use of a mobile phone to send out the search request. The central server stores the search request information as the users' search history. In such a scenario, given the portability of the communication devices, the aim of tracking the users' actions and the ability to configure the search results and keywords accordingly can be realized. The user is no longer physically bound to a stationary personal computer where he/she has to be in a fixed geographical location to be able utilize the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art recognize many modifications may be made to this configuration without departing from the scope or spirit of the claimed subject matter.

While the subject matter is described above in the general context of computer-executable instructions of a computer program that runs on a computer and/or computers, those skilled in the art recognize that the innovation also may be implemented in combination with other program modules. Generally, program modules include routines, programs, components, data structures, and the like, which perform particular tasks and/or implement particular abstract data types. Moreover, those skilled in the art appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A next search keyword presentation apparatus, comprising:
an input unit for inputting a search keyword;
a search control unit which sends the search keyword to a search system and receives a search result from the search system in the form of a plurality of documents;
a display unit which displays the documents of the search result;
a text body extraction unit which extracts a text body from the plurality of search result documents, wherein the text body extraction unit removes a portion from the plurality of search result documents deemed unrelated to the text body;
an analysis unit which carries out a semantic attribute analysis of words contained within the text body;
a storage unit which stores the search keyword as user history data uniquely provided for each user;
a creation unit which creates document representative information based on the semantic attributes of each word and the history data; and
a cluster representative keyword extraction unit which clusters document characteristic information and extracts cluster representative keywords; wherein
the display unit displays the cluster representative keywords as the next search keyword candidate in response to inputting the search keyword.

2. The apparatus according to claim 1, wherein the storage unit further stores actions performed by a user on the next search keyword candidates as the user history data.

3. The apparatus according to claim 1, wherein the search system is an externally attached system which carries out a search after receiving the search keyword and sends the search results back to the search control unit.

4. The apparatus according to claim 1, wherein the analysis unit carries out semantic attribute analysis on each word within the documents of the search results based on either a dictionary matching entry or a prefix or suffix expression rule entry.

5. The apparatus according to claim 4, wherein the creation unit creates the document characteristic vector by carrying out semantic attribute analysis on the input search keywords and collating the certainty factors of each semantic attribute based on the dictionary matching entry or prefix or suffix expression rule-entry.

6. The apparatus according to claim 1, wherein the cluster representative keyword extraction unit extracts unique document representative keywords for the documents within the cluster and the cluster representative keyword for the cluster containing the documents.

7. The apparatus according to claim 1, wherein the display unit displays the next search keyword candidates around the vicinity of search result document links.

8. The apparatus according to claim 1, wherein the display unit displays the next search keyword candidates in a separate pop-up window when the user brings the cursor above search result document links.

9. The apparatus according to claim 5, wherein the creation unit creates the document characteristic vector by multiplying the certainty factor contained within the user preference vector with the number of occurrences of the document representative keyword within the document.

10. The apparatus according to claim 1, wherein the cluster representative keyword extraction unit extracts two clusters with a largest distance between them by calculating the distances between the keywords of individual clusters.

11. The apparatus according to claim 1, wherein when there is a plurality of clusters corresponding to an input search keyword, the cluster representative keywords of each individual cluster are displayed on the display unit.

12. The apparatus according to claim 1, wherein the cluster representative keyword extraction unit extracts a plurality of document representative keywords for each of a plurality of documents before selecting a cluster representative keyword from the plurality of document representative keywords.

13. The apparatus according to claim 11, wherein when there is only one cluster corresponding to an input search keyword, the document representative keywords of each individual documents within the cluster would be displayed on the display unit.

14. A next search keyword presentation method, comprising:
inputting a search keyword;
sending the search keyword to a search system and in turn, receiving a plurality of documents generated by the search system in response to the search keyword;
displaying the plurality of documents from the search results on the display;
removing a portion from the plurality of documents deemed unrelated to a text body;
extracting the text body from the plurality of documents;
performing semantic analysis on each word contained within the plurality of documents;
storing the search keyword as user history data uniquely provided for each user in a storage unit;
creating document representative information based on the semantic attributes of each word and the user history data stored in the storage unit;
clustering of document representative information and selecting a cluster representative keyword from the document representative keywords of the documents contained within the cluster; wherein
the extracted cluster representative keyword is displayed on the display as a next search keyword candidate.

15. A computer-readable recording medium that stores therein a computer program for managing a computer to present a next search keyword on a display, comprising:
an input unit for receiving a search keyword;
a search control unit which sends the search keyword to a search system and receives a search result from the search system in the form of a plurality of documents;
a text body extraction unit which extracts a text body from the plurality of search result documents, wherein the text body extraction unit removes a portion from the plurality of search result documents deemed unrelated to the text body;
an analysis unit which carries out a semantic attribute analysis of words contained within the text body;
a storage unit which stores the search keyword as user history data;
a creation unit which creates document representative information based on the semantic attributes of each word and the history data; and
a cluster representative keyword extraction unit which clusters document characteristic information and extracts cluster representative keywords; wherein
the cluster representative keywords represent the next search keyword candidate in response to inputting the search keyword.

16. The computer-readable recording medium according to claim 15, wherein the computer-readable recording medium is a CD.

17. A computer implemented method for managing a computer to present a next search keyword on a display, comprising:
inputting a search keyword;
sending the search keyword to a search system and receiving a plurality of documents generated by the search system in response to the search keyword;
displaying the plurality documents from the search results on the display;
removing a portion from the plurality of documents deemed unrelated to a text body;
extracting the text body from the plurality of documents;

performing semantic analysis on each word contained within the plurality of documents;

storing the search keyword as user history data in a storage unit;

creating document representative information based on the semantic attributes of each word and the history data stored in the storage unit;

clustering of document representative information and selecting a cluster representative keyword from the document representative keywords of the documents contained within the cluster; wherein the extracted cluster representative keyword is displayed on the display as a next search keyword candidate.

* * * * *